Oct. 20, 1936.   F. A. LÖNNBERG   2,058,382
LAWN MOWER
Filed May 9, 1935   2 Sheets-Sheet 1
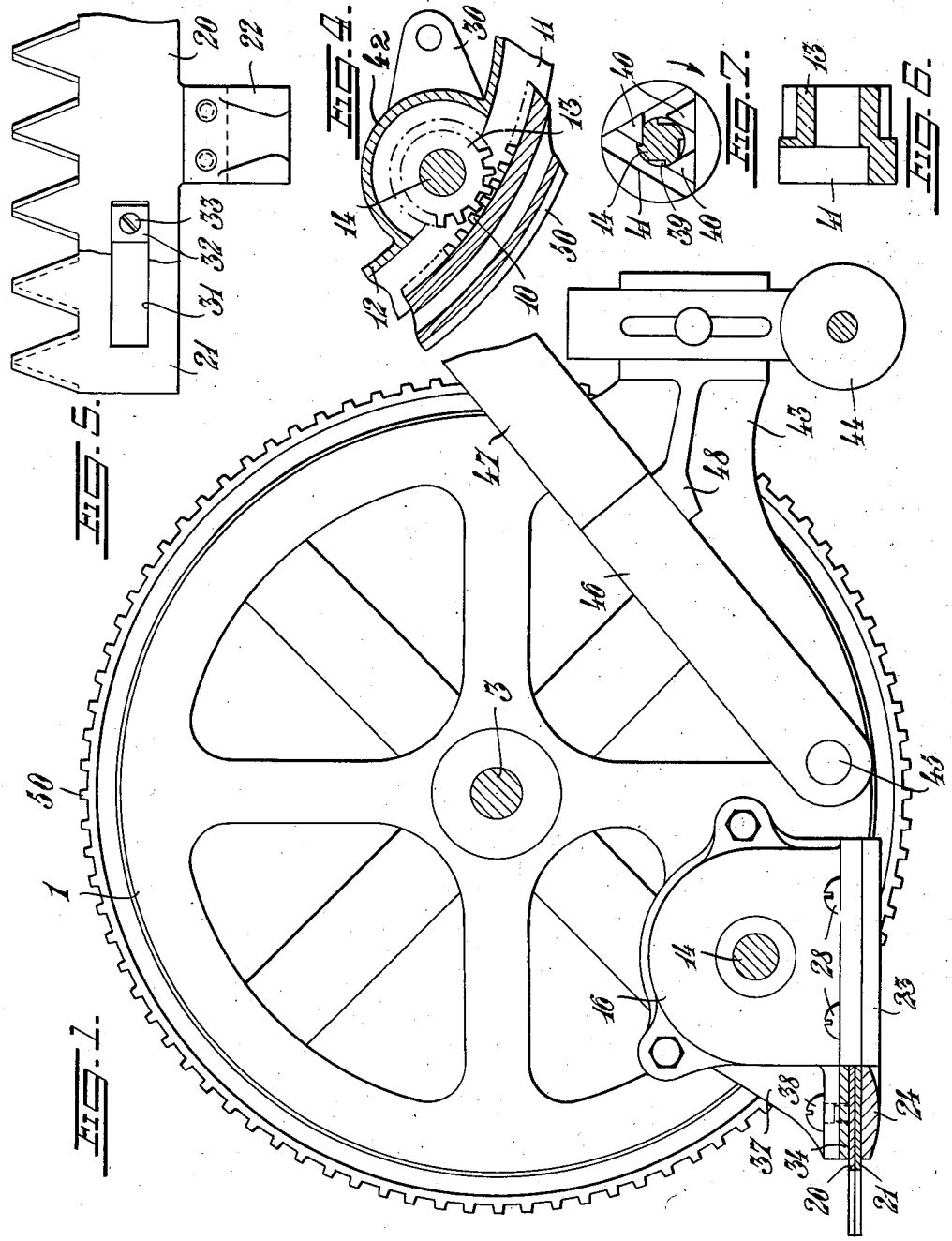

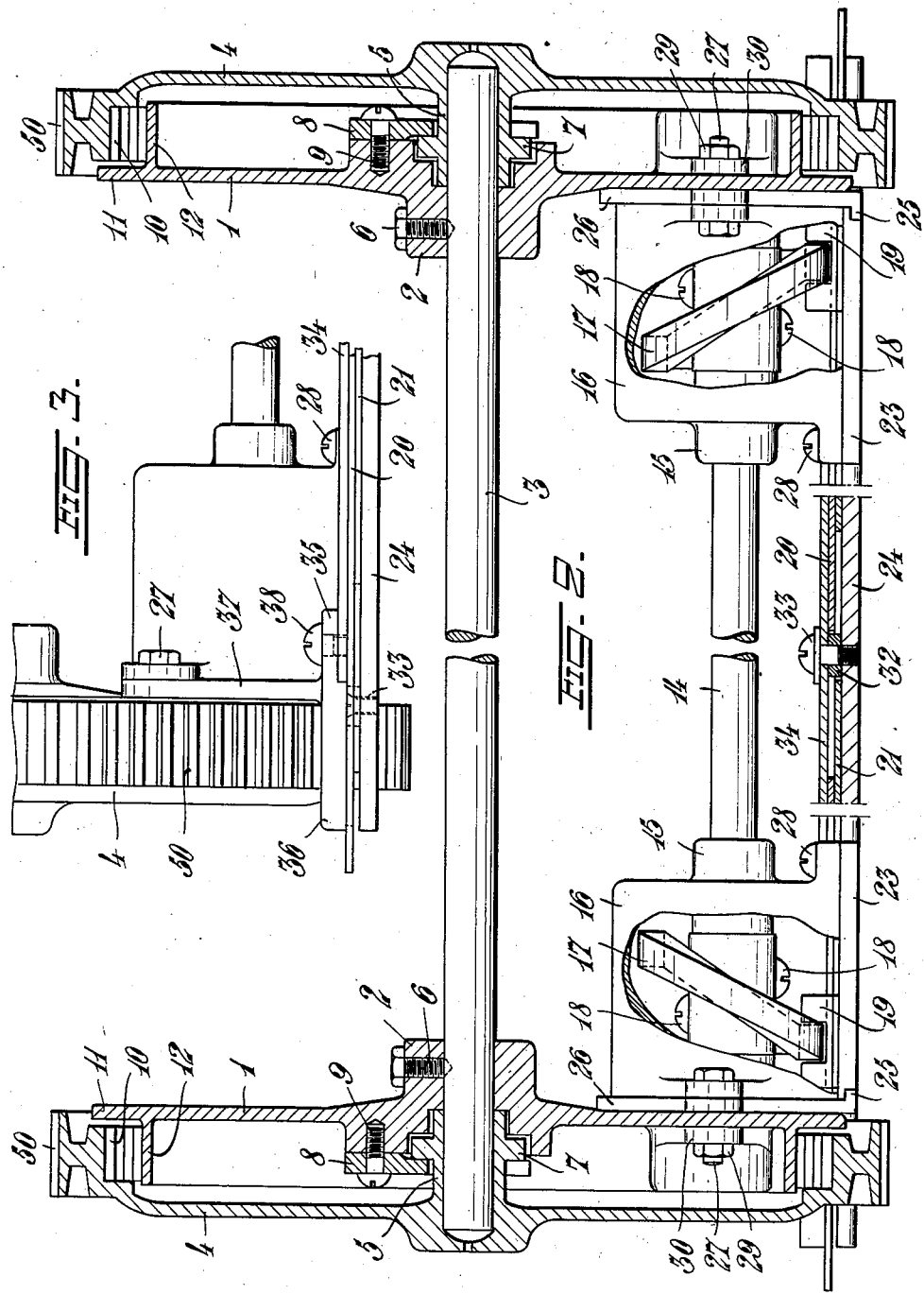

Patented Oct. 20, 1936

2,058,382

UNITED STATES PATENT OFFICE 2,058,382

LAWN MOWER

Frans Artur Lönnberg, Kristinehamn, Sweden

Application May 9, 1935, Serial No. 20,694
In Sweden December 14, 1934

3 Claims. (Cl. 56—262)

The present invention relates to lawn mowers of the kind having cutter-blades adapted, upon the pushing forward of the mower, to reciprocate in opposite directions with relation to each other.
In lawn mowers of this kind it is already known to impart the motion of the supporting wheels to a driving shaft for actuating the cutter-blades.

To this end the supporting wheels are each provided with an internal gear engaged by a pinion on the transversely extending driving shaft, the motion of which is imparted to the cutter-blades by means of cams or eccentrics.

The object of the invention is to provide a lawn mower of the above said type which is compact and simple in construction and powerful in operation.

The invention is characterized, chiefly, by the provision on the supporting shaft, adjacent the inner face of each supporting wheel, of a disk forming an annular space in each wheel inside the internal gear thereof and carrying on its face remote from the supporting wheel a casing for a separate one of the cams or eccentrics on the driving shaft. Another feature involves the provision of a removable bottom for each of these casings, said bottoms being connected together by a member serving as a supporting bar for the cutter-blades, so that the interior of the casings may be accessible and the cutter-blades released after removal of the base portion comprising said bottoms and said supporting bar.

In the drawings, one embodiment of the invention is illustrated. Fig. 1 is a vertical section of the lawn mower taken at right angles to the supporting shaft. Fig. 2 is a rear view of the mower in which some of the parts are shown in section and some other parts are shown broken away. Fig. 3 is a front end view of some parts of the mower. Fig. 4 is an end view of a pinion with part of the supporting wheel and disk shown in section. Fig. 5 is a top plan view of part of the cutter-blades. Fig. 6 is an axial section of a pinion. Fig. 7 is a cross section of the driving shaft with an associated ratchet gear.

Referring to the drawings, the numeral 1 indicates two disks, preferably formed with arms, which are mounted on the supporting shaft 3 of the mower adjacent the inner faces of the supporting wheels 4 mounted on the ends of the shaft.
The hubs 2 of the disks 1 are rigidly attached to the shaft 3 by means of screws 6. The hubs 5 of the supporting wheels 4 are rotatably mounted on the shaft 3. They are formed with flanges 7 bearing against corresponding shoulders of the hubs 2, and are held against axial displacement by stirrups 8 secured to the hubs 2 by screws 9. As a result the supporting wheels 4 are allowed to rotate freely with relation to the supporting shaft 3 and to the disks 1 but are prevented from axial movement with relation thereto. The supporting wheels carry axially extending ribs 50 on their rim to increase friction between the wheels and the ground and are each provided with an internal gear 10 to permit transmission of power from the supporting wheels to the cutting members. The disks 1 are each provided with a radially extending peripheral flange 11 and, at a distance from the outer periphery of said flange, with an axially extending annular flange 12, said flanges forming, together with corresponding portions of the respective wheel 4, an annular, substantially closed, space inside the internal gear 10 of the supporting wheel. Meshing with the internal gear 10 of each supporting wheel is a pinion 13 on the respective end of a transverse driving shaft 14 which is mounted, in part, in bearing sleeves, not shown, of the disks 1 and, in part, in bearing sleeves 15 of casing 16 secured to the disks 1, through which the shaft 14 extends and inside each of which the shaft 14 carries a driving disk 17 for the cutting members. The driving disks 17 are secured to the shaft 14 by means of screws 18. Said driving disks 17 comprise axial cams which play in guide members 19 hereinafter referred to as sockets which are secured to the cutting members. They are displaced 180° with relation to each other so as to reciprocate the sockets in opposite directions with relation to each other as a result of the rotation of shaft 14. Each of the sockets 19 is attached to a separate cutting member.

The cutting members comprise an upper and a lower blade-cutter 20 and 21, respectively. The cutters are provided with teeth with beveled edges. The sockets 19 are secured to supporting members 22 projecting from the back of the cutter-blades, as shown in Fig. 5. The sockets 19 are guided on the removable bottom pieces 23 of the casings 16. Said bottom pieces 23 are formed integrally with a connecting member 24 representing a supporting bar for the blades 20, 21. The base structure formed by two bottom pieces 23 and the connecting member 24 is removable as a whole and may be inserted in place from the fore end of the machine with the undercut ends of the bottom pieces 23 sliding on shoulders 25 at the lower end of plates 26 secured to or formed integrally with the disks 1, which are adapted to serve as carriers and end walls for the casings 16. The casings 16 are secured to these plates 26 and to the bottom piece 23 by means of bolts 27 and screws 28, the bolts 27 extending through lugs on the casings 16 and on the outer face of the disks 1, and being held in position by nuts 29 bearing against lugs 30 provided at the outer surface of disks 1.

In order to guide the cutter-blades, longitudinally extending apertures 31 are formed therein, viz. one at each end of the blades and one in the middle thereof. In Fig. 5 one of the end apertures is shown. Each aperture is engaged by a sliding block 32 having a boring to receive a screw 33 which is screwed into a threaded boring formed in the supporting bar 24. One of these screws, namely the middle one, is shown in Fig. 2 of the drawings. This screw also extends through a protecting bar 34 resting on the upper blade 20, which is removably held against said blade with a pressure that may be arbitrarily varied by means of said middle screw 33. At its ends the protecting bar engages under flanges 35 of stationary protecting plates 36 which cover the apertures 31 at the ends of the blades in order to prevent said apertures from being choked up by the cut grass. The protecting plates 36 are formed integrally with wings 37 projecting from the members 26. The protecting bar 34 is held to the projections 35 by screws 38, Fig. 3.

Each end of the driving shaft 14 projects into the space between the respective disk 1 and supporting wheel 4, where it carries the pinion 13. The pinions 13 are rotatably mounted on the shaft 14 and are adapted to be rotated only when the lawn mower is pushed forwardly. To this end the shaft 14 is formed at each end with a number of teeth 39, Fig. 7, to be engaged by a ratchet mechanism comprising three triangle-shaped sliding blocks 40 each loosely inserted at a separate corner of a triangle-shaped recess 41 formed in the hub portion of the pinion 13. Said ratchet mechanism acts in well-known way so that upon the rotation of shaft 14 in the direction of the arrow in Fig. 7 the member 40 which for the time being is situated above the shaft will drop in front of a tooth 39, as soon as it is allowed to do so, and will then be clamped between said tooth and the adjacent wall of the recess 41, as will readily appear from Fig. 7. Of course, I may also use some other appropriate ratchet mechanism without departing from the principle of the invention. The radial distance between each internal gear 10 and the respective axial flange 12 is less than the diameter of the pinion 13, so that an aperture must be formed in the flange 12 for the pinion. In order to prevent grass from entering the annular space of the supporting wheel through this aperture, the flange 12 may be curved to form a cover 42, surrounding the pinion 13, as shown in Fig. 4.

The disks 1 are each formed with a rearwardly extending projection 43, serving as a support for a vertically adjustable roller 44 through the adjustment of which the level of the blades above ground may be varied.

Connected to the disks 1 by pivots 45 are arms 46 to receive the handle 47. Said arms in their lowermost or normal position rest on stops 48.

In operation, when the lawn mower is pushed forwardly, the driving shaft 14 is caused to rotate by power imparted thereto from the supporting wheels by way of the internal gears 10 and the pinions 13, and the rotation of shaft 14 causes the cam disks 17 to reciprocate the cutter-blades in opposite directions with relation to each other, causing the teeth of the blades to cut the grass.

What I claim is:—

1. In a lawn mower, a pair of supporting wheels each provided with an internal gear, a frame structure comprising a main shaft rotatably carrying said supporting wheels, disks secured to said shaft adjacent the inner faces of said wheels so as to form covers therefor, means carried by said disks to lock the wheels against axial displacement on the shaft, casings carried by said disks, a unitary base structure comprising removable bottoms for said casings and a connecting member for said bottoms, a pair of superimposed cutter-blades mounted on said connecting member, a driving shaft for said cutter-blades extending through said casings, oppositely arranged oblique driving disks on said driving shaft inside said casings, members carried by the cutter-blades to be engaged by said driving disks for reciprocating the blades longitudinally in the direction of the driving shaft upon the rotation thereof, means to guide the blades in their lateral direction with relation to each other during their longitudinal motion, and means including a protecting bar and screw to exert an adjustable pressure on said cutter-blades.

2. In a lawn mower, a main shaft, a pair of supporting wheels rotatably carried by said main shaft, an internal gear in each wheel, a disk secured to the shaft adjacent the inner face of each supporting wheel, so as to form a cover therefor, flanges on each disk to form a substantially closed annular space in each wheel inside the internal gear thereof, means secured to each disk to hold the respective wheel against axial displacement, another shaft journalled in said disks parallel to said first-mentioned shaft, oppositely acting axial cams on said other shaft, casings for said cams each carried by a separate one of the said disks, removable bottoms for said casings, a connecting member formed integral with said bottoms, a shelf-like projection extending forwardly from said bottoms and connecting member, a pair of superimposed cutter-blades carried by said shelf-shaped projection so as to extend in a direction parallel to that of the shafts, members on said blades to be engaged by said cams to move the blades simultaneously in opposite directions on said shelf, a protecting bar on the upper blade, and means to press said protecting bar with a variable pressure against the cutter-blades.

3. In a lawn mower, a pair of supporting wheels having each an internal gear, a frame structure comprising a main shaft, rotatably supporting said wheels, a disk secured to said shaft near each end thereof, so as to form a cover for the respective supporting wheel and its gear, casings carried by said disks at their sides facing each other, removable bottoms for said casings, a connecting member between said bottoms formed integrally therewith, a shaft extending through said casings and journalled in the disks and the casings, cams on said shaft inside said casings, members mounted to slide on the bottoms in the casings parallel to said shaft, said members being engaged by said cams, a shelf-like projection extending forwardly from said bottoms and said connecting member, a pair of superimposed cutter-blades carried by said shelf-like projection, each of said blades being connected to a separate one of said slidable members, separate protecting plates for the end portions of the blades, a removable protecting bar for the middle portion of the blades, and screws to press said removable protecting bar against the blades with a variable pressure.

FRANS ARTUR LÖNNBERG.